(12) United States Patent
Hinds

(10) Patent No.: US 8,387,998 B2
(45) Date of Patent: Mar. 5, 2013

(54) STEERING MECHANISM FOR A SUGARCANE HARVESTER

(75) Inventor: Michael L. Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 218 days.

(21) Appl. No.: 12/943,343

(22) Filed: Nov. 10, 2010

(65) Prior Publication Data

US 2012/0112428 A1 May 10, 2012

(51) Int. Cl.
*B60G 7/00* (2006.01)

(52) U.S. Cl. ....... 280/93.51; 280/442; 56/53; 172/624.5

(58) Field of Classification Search .............. 56/13.3, 56/13.9, 53, 58, 97, 197, 273, 400.1, 504; 280/89.12, 93.502, 93.51, 442; 172/614, 172/619, 623, 624, 624.5, 625, 631, 634
See application file for complete search history.

(56) References Cited

U.S. PATENT DOCUMENTS

| | | | | |
|---|---|---|---|---|
| 1,999,748 A * | 4/1935 | Baratelli | | 280/443 |
| 2,196,025 A * | 4/1940 | Paradise et al. | | 56/13.9 |
| 3,103,091 A * | 9/1963 | Duncan et al. | | 56/13.9 |
| 3,791,114 A * | 2/1974 | Fowler | | 56/13.9 |
| 4,165,596 A * | 8/1979 | Duncan | | 56/14.3 |
| 4,483,130 A * | 11/1984 | Duncan | | 56/14.3 |
| 4,622,804 A * | 11/1986 | Krone et al. | | 56/13.9 |
| 4,677,813 A * | 7/1987 | Stiff et al. | | 56/13.9 |
| 4,722,174 A * | 2/1988 | Landry et al. | | 56/14.5 |
| 6,363,700 B1 * | 4/2002 | Fowler | | 56/13.9 |
| 6,745,550 B1 * | 6/2004 | Hinds et al. | | 56/13.9 |
| 8,230,669 B2 * | 7/2012 | Hinds | | 56/53 |
| 2009/0184491 A1 * | 7/2009 | Neudorf et al. | | 280/442 |

* cited by examiner

*Primary Examiner* — Ruth Ilan
*Assistant Examiner* — James English

(57) ABSTRACT

A steering mechanism for a sugarcane harvester having pivotable forward frame sections and a pivotal topper assembly for maneuverability. The steering mechanism includes arms extending from the respective frame sections and topper assembly. Steering links pivotally interconnect the arms in a way that the topper steering arm is sandwiched between a pair of links. An eccentric pivotal connection between the topper steering arm and the links is provided to accommodate the change in radius. Actuators connect to the links to provide movement of the steering arms.

20 Claims, 3 Drawing Sheets

STEERING MECHANISM FOR A SUGARCANE HARVESTER

FIELD OF THE INVENTION

The present invention relates to steering mechanisms for work machines, and, more particularly, to sugarcane harvesters.

BACKGROUND OF THE INVENTION

The sugarcane harvester has wide application worldwide in the mechanized harvesting of sugarcane. In many applications, the sugarcane farm is of relatively small size, particularly in the third world. With such a small size acreage and tightly spaced crops, maneuverability of the sugarcane harvester at the ends of the row becomes particularly important. This maneuverability is made even more critical by the use of a topper mechanism that extends substantially from the main frame of the harvester forward down the row to cut off the top of the sugarcane at an appropriate length to enable subsequent cutting and processing of the stalk. Because the topper mechanism extends significantly beyond the front of the harvester, the maneuverability of prior art sugarcane harvesters with fixed topper booms is extremely limited.

It has been proposed to have a sugarcane harvester with a topper mechanism that pivots with adjacent crop dividers to provide significantly increased maneuverability when approaching the beginning of a crop row. This has proved significantly advantageous in small acreage sugarcane plots and greatly increases the utility and usefulness of the sugarcane harvester. Such mechanism includes a single actuator mounted on the outboard section of the harvester to drive the pivot levers for the topper mechanism and the crop divider frame sections. This arrangement provides effective pivoting of the mechanism but has a difference in force applied depending upon the direction of the turn owing to the differential surface area in the hydraulic actuator used to power such devices. Furthermore, the actuator is on an outboard section that could be exposed to crop material.

Therefore, what is needed in the art is a mechanism that provides uniform steering, force, and protection of the steering elements.

SUMMARY

In one form, the invention includes a steering mechanism for first and second outboard pivotal components and a central pivotal component of a mobile work machine. The steering mechanism includes first and second steering arms extending from the first and second pivotal components so that movement of the end of the steering arms causes the first and second components to pivot. A central steering arm extends from the central pivotal component so that movement of the end of the central steering arm causes the central component to pivot. First and second links pivotally interconnect with the ends of the first and second steering arms to provide joint pivoting of the first and second steering arms. First and second actuators interconnect with the links to provide displacement and pivoting movement of the first and second steering arms. A pivotal connection is provided to the end of the central steering arm between the first and second links at the midpoints thereof, this connection accommodating a change in radius with the pivoting of the central steering arm.

The invention, in another form, includes a mobile work machine having outboard pivotal sections and a centrally mounted component. A steering mechanism for the work machine includes first and second steering arms extending from the first and second pivotal components so that movement of the end of the steering arms causes the first and second components to pivot. A central steering arm extends from the central pivotal component so that movement of the end of the central steering arm causes the central component to pivot. First and second links pivotally interconnect with the ends of the first and second steering arms to provide joint pivoting of the first and second steering arms. First and second actuators respectively interconnect with the first and second links to provide pivoting movement. A pivotal connection is provided to the end of the central steering arm between the first and second links at the mid points thereof, the connection accommodating a change in radius with pivoting of the central steering arm.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION

Figure 1:
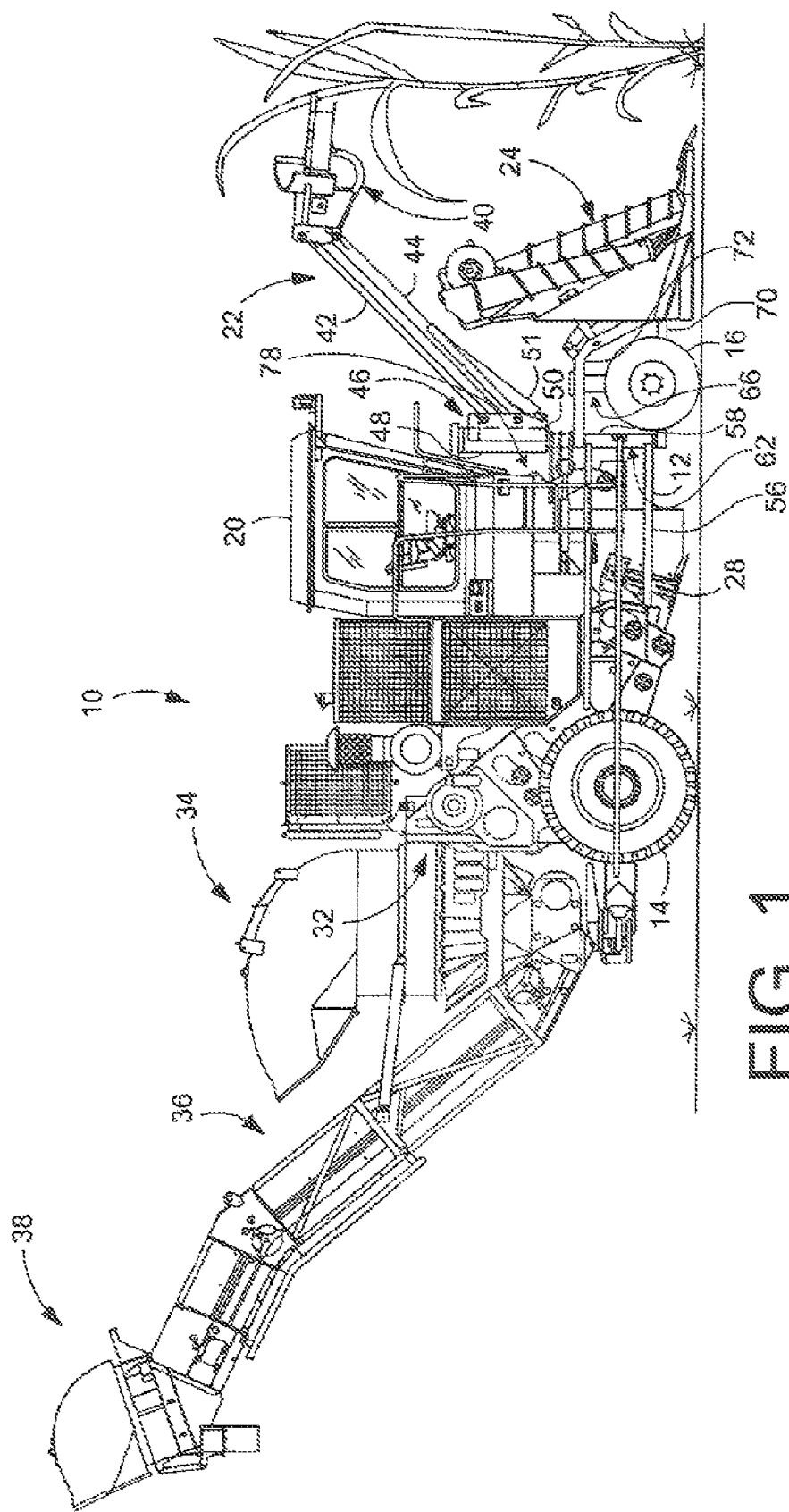
FIG. 1 is a side elevation view of a sugarcane harvester having a steering mechanism embodying the present invention.

Referring now to FIG. 1, there is shown a sugar cane chopper harvester 10, here depicted as a rubber tired, chopper harvester. The harvester 10 includes a main frame 12 supported on a pair of rear drive wheels 14 and a pair of steerable front wheels 16, only one of which is shown. An operator cab 20 is located at a central, forward location of the frame 12, and located behind the cab 20 is an engine, (not visible), which provides the power for driving the wheels 14 and other driven components of the harvester 10.

The cab 20 gives a seated or standing operator a vantage point for viewing the operation of front-mounted equipment including a topper mechanism 22 mounted to the frame 12 between right- and left-hand crop divider assemblies 24, only one of which is shown. Located just behind and inwardly of the front wheels 16 of the harvester 10, so as to be at opposite sides of a longitudinal centerline of the harvester, are right- and left-hand base cutter units 28, only one of which is shown, having cutting blades located so as to overlap at the middle of the harvester 10.

Thus, during operation, the crop divider assemblies 24 straddle a row of cane stalks which pass beneath the frame 12 and are severed from the ground by the base cutter units 28.

The base cutter units 28 deliver the stalks to the rear to a feed roller assembly (not shown) that transports the cane stalks to a chopper assembly 32 located between and at a height above the rear wheels 14. The chopper assembly 32 cuts the cane stalks into lengths called billets which are fed into a primary extractor assembly 34 that operates to clean unwanted material such as leaves and other crop pieces from the billets. The billets then pass into a loading elevator assembly 36 to a secondary extractor assembly 38 which acts to extract further trash from the billets as they are conveyed to a wagon, or the like, that is pulled alongside the harvester 10.

The topper mechanism 22 includes a gathering and cutting head 40 that is kept in a level attitude by being mounted to the frame 12 by a boom including upper and lower parallel arms 42 and 44, respectively. The rear ends of the arms 42 and 44 are respectively pivotally coupled to a swing frame 46 including a tubular member 48 mounted for swinging about a vertical axis defined by a cylindrical support post 50 that is fixed to a central location of the main frame 12 just below a lower region of the cab 20. An extensible and retractable boom actuator 51 is coupled between the swing frame 46 and the lower arm 44 and is operable for controlling the operating height of the cutting head 40.

The main frame 12 includes right- and left-hand side members 56, to the forward ends of which right- and left-hand forward frame sections 58 coupled by right- and left-hand pivot assemblies 62, of which only the details of the right-hand pivot assembly 62 are shown, it being understood that the left-hand pivot assembly is similar. The right- and left-hand pivot assemblies 62 include respective vertical cylindrical, tubular receptacles 66 forming forward ends of the side members 56, and respective pivot pins or posts (not shown) respectively received for pivoting within the receptacles 66 and fixed to rear ends of top and bottom, horizontal frame members 72 and 70, respectively, of the right- and left-hand front frame sections 58. The front wheels 16 are mounted to respective axles carried by the forward frame sections 58 of the main frame 12. Also mounted to the front frame sections 58 are the right- and left-front crop divider assemblies 24.

Figure 2:
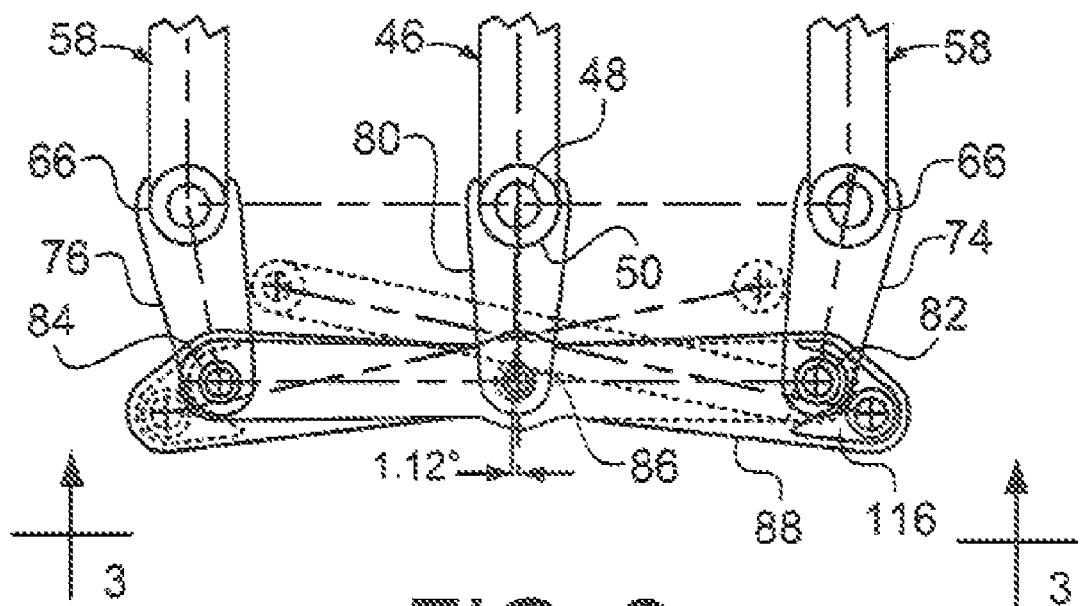
FIG. 2 is a fragmentary elevational view of the steering mechanism of FIG. 1 showing the components in a straight ahead position.
Figure 3:
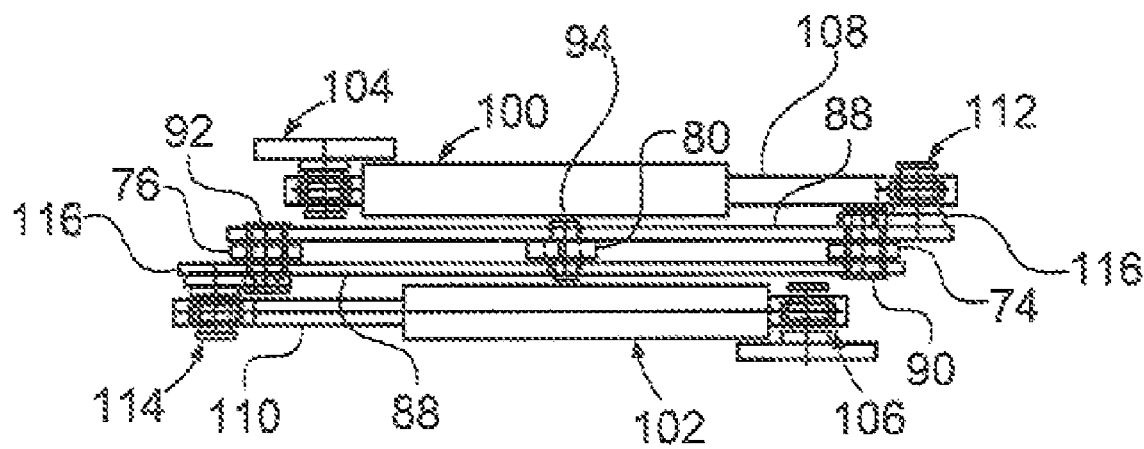
FIG. 3 is a side view taken on lines 3-3 of FIG. 2.

In accordance with the present invention, a steering mechanism, generally indicated by reference character 78 in FIG. 1 and shown in detail in FIGS. 2-5 is provided to simultaneously steer the frame sections 58 and the topper assembly 22. As shown in FIGS. 2 and 3, a right wheel steering arm 74 is fixed to the top of the right tubular receptacle 66. A left wheel steering arm 76 is fixed to the top of the left tubular receptacle 66 at the front of the left front frame side member 56. A topper assembly steering arm 80 is fixed to the tubular member 48 of the topper assembly 22.

Figure 5:
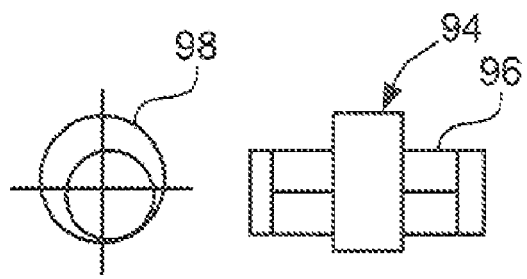
FIG. 5 is an expanded detail of an eccentric interconnection between components of the steering mechanism of FIGS. 2, 3, and 4.

Steering arms 74, 76, and 80 each have outer ends with circular openings 82, 84, and 86 respectively. A pair of links 88 are pivotally connected to steering arms 74 and 76 on opposite sides thereof by pins 90 and 92 respectively to provide simultaneous pivoting between steering arms 74 and 76. In addition, as shown particularly in FIG. 3, the links 88 extend over opposite faces of steering arm 80 so as to sandwich it therebetween at the midpoint of the links 88. A pivoting connection 94 is provided between the sandwiched steering arm 80 and the links 88. The pivotal connection 94 is shown in FIG. 5 in expanded detail. The pivoting connection 94 includes a cylindrical section 96 extending through corresponding circular holes in the links 88. A central cylindrical section 98 is received in the opening 86 in steering arm 80 so as to provide eccentric motion between the axis of circular opening 86 and the relative central axis of the openings in the links 88 as will be described later.

In order to pivot the respective steering arms, first and second actuators 100 and 102 are provided. These actuators are illustrated as being hydraulic. However, other forms may be employed as appropriate. Actuators 100 and 102 are pivotally connected to the frame through pinned connections 104 and 106 respectively. The actuators 100 and 102 have actuating rods 108 and 110, which are pivotally connected to links 88 at pinned connections 112 and 114 respectively. Pin connections 112 and 114 are on raised bosses 116 on the links 88 to provide appropriate clearance for the actuating rod. As illustrated, links 88 are duplicates of one another with the upper link having the boss 116 facing up and the lower link having the boss 116 facing down. This provides for economies in manufacture of the components.

The actuators 100 and 102 are connected to an appropriate operator hydraulic control system so as to provide simultaneous movement of the ends of steering arms 74, 76, and 80 and steer the sugarcane harvester in a way that the topper mechanism and the forward frames pivot as the sugarcane harvester is turned, so as to provide greater maneuverability. The actuators 100 and 102 act in a way that the hydraulic force between left and right hand turns is balanced so as to provide smoother transition. In addition, the actuators 100 and 102 are closely coupled with the steering arms 74, 76, and 80 and are inboard of the sugarcane harvester to eliminate exposure to plants in the field.

Figure 4:
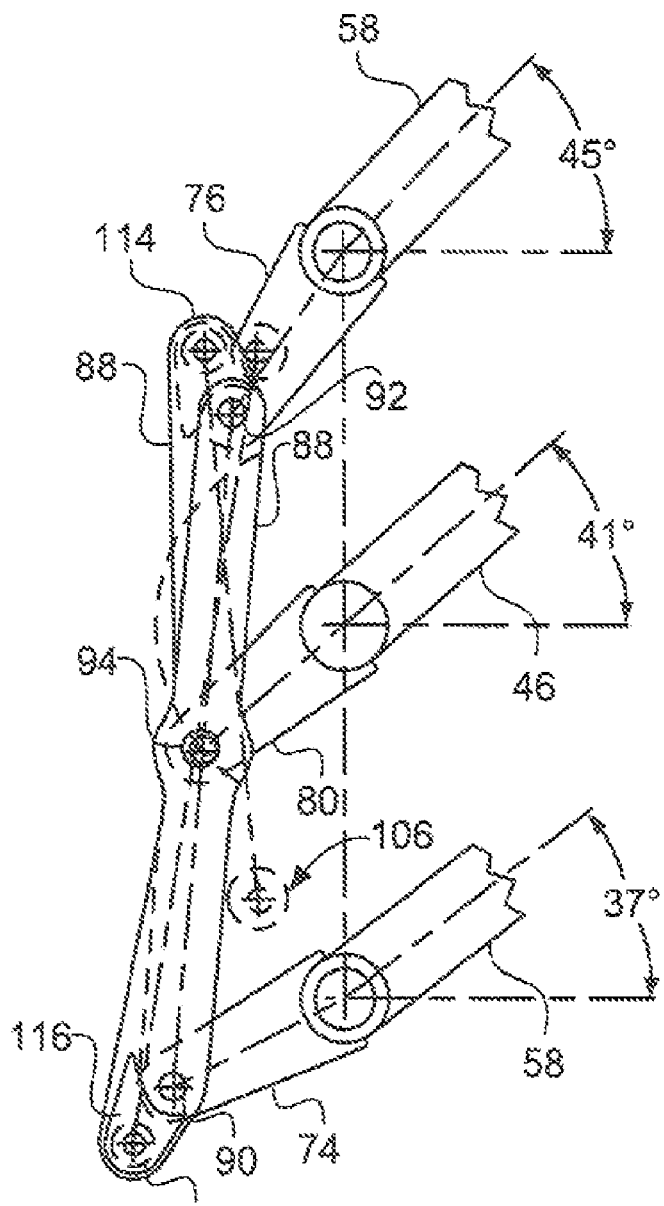
FIG. 4 is a fragmentary elevational view of the steering mechanism of FIG. 2 in a position indicating a left turn.

As shown in FIG. 4 illustrating a left turn, each of the right and left frame sections and swing frame 46 provide an angle with respect to the forward direction of the sugarcane harvester to properly track around the corner. As evident in FIGS. 2 and 4, the steering arms 74 and 76 are angled inward to accommodate the turning radius and the illustrated turning in is ten degrees, although other geometries may be provided as appropriate.

Because the steering arm 80 experiences a change in radius relative to the links 88, the pivotal connection 94 accommodates the slight difference in radius. In order that the movement of the eccentric connection 94 be in a radial direction of steering arm 80, the center steering arm 80 is angled by approximately 1.12 degrees when the frame sections 58 and swing frame 46 are pointed in a forward direction as shown in FIG. 2. The eccentric connection 94 is preferable to other forms of flexible connections since it minimizes wear, although other connections may also be employed.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A steering mechanism for first and second outboard pivotal components and a central pivotal component of a mobile work machine, said steering mechanism comprising:
   first and second steering arms extending from said first and second pivotal components so that movement of ends of said steering arms causes said first and second components to pivot;
   a central steering arm extending from said central pivotal component so that movement of an end of said central steering arm causes said central component to pivot;
   first and second links having a pivotal connection with the ends of said first and second steering arms to provide joint pivoting of said first and second steering arms;

first and second actuators respectively connected to said links adjacent the pivotal connection with said steering arms to provide pivoting movement thereof, and a pivotal connection to the end of said central steering arm between said first and second links at mid points thereof, said pivotal connection to the end of said central steering arm accommodating a change in radius with the pivoting of said central steering arm.

2. The steering mechanism as claimed in claim 1, wherein said links are positioned on opposite faces of said first and second steering arms and sandwiches the central steering arm between said links.

3. The steering mechanism as claimed in claim 2, wherein the pivotal connection to the end of said central steering arm accommodating a change in radius is positioned between the central steering arm and said links.

4. The steering mechanism as claimed in claim 3, wherein said pivotal connection to the end of said central steering arm comprises circular pins received in said links and an eccentric central circular section received in a circular hole in said central steering arm.

5. The steering mechanism of claim 4, wherein when said first and second outboard pivotal components are in a forward directed position, said central steering arm is angled from a plane of its associated component.

6. The steering mechanism of claim 5, wherein said angle is approximately 1.12 degrees.

7. The steering mechanism as claimed in claim 5, wherein when said first and second components are in a straight ahead position, said steering arms are angled inward with respect to the plane of said first and second components.

8. The steering mechanism as claimed in claim 7, wherein said angle is approximately 10 degrees.

9. The steering mechanism as claimed in claim 1, wherein the first and second links are plate-like with an extended section each receiving one of said first and second actuators.

10. The steering mechanism as claimed in claim 9, wherein said links are identical and have bosses to provide actuator clearance, said links being transposed relative to one another to provide the clearance.

11. A work machine comprising:
a main frame supported on a pair of rear drive wheels and a pair of front steerable wheels;
a central pivotal component pivotally mounted to said main frame;
first and second pivoting frame sections respectively mounted to forward ends of opposite sides of the main frame, said first and second pivoting frame sections being pivotal with respect to said main frame;
first and second steering arms extending from said first and second pivoting frame sections so that movement of an end of said steering arms causes said first and second pivoting frame sections to pivot;
a central steering arm extending from said central pivotal component so that movement of an end of said central steering arm causes said central component to pivot;
first and second links pivotally interconnected with the ends of said first and second steering arms to provide joint pivoting of said first and second steering arms and said pivoting frame sections;
first and second actuators connected to said main frame and respectively connected to ends of said first and second links; and,
a pivotal connection to the end of said central steering arm between said first and second links at mid points thereof, said pivotal connection to the end of said central steering arm accommodating a change in radius with the pivoting of said central steering arm.

12. The work machine as claimed in claim 11, wherein said work machine is a sugarcane harvester, said central component is a topper, and said first and second pivoting frames include a crop dividing function.

13. The work machine as claimed in claim 12, wherein said links are on opposite sides of said first and second steering arms and extend crosswise in said work machine and sandwiching said central steering arm therebetween.

14. The work machine as claimed in claim 13, wherein the connection between said central steering arm and said links comprises pins received in openings in said links and an eccentric central circular section received in a circular hole in said central steering arm to accommodate variations in radius.

15. The work machine as claimed in claim 12, wherein when said pivoting frame sections are in a straight ahead direction relative to said frame and said central component is parallel to said pivoting frame sections, said central steering arm is angled from the plane of the central component.

16. The work machine as claimed in claim 15, wherein the steering arms connected to said first and second pivoting frames sections are angled inward 10 degrees relative to the plane of said pivoting frame sections.

17. The work machine as claimed in claim 12, wherein said links are plate-like with extended sections receiving said actuators.

18. The work machine as claimed in claim 17, wherein said links are identical and have bosses to provide actuator clearance.

19. The work machine as claimed in claim 18, wherein said actuators are hydraulic actuators.

20. The work machine as claimed in claim 12 wherein said steerable wheels are supported by said pivoting frame sections to be steered by pivoting of said frame sections.

* * * * *